United States Patent Office 3,392,222
Patented July 9, 1968

3,392,222
METHOD FOR FINISHING CONCRETE
William A. Cordon, Logan, Utah, assignor to
Martin-Marietta Corporation
No Drawing. Filed Jan. 30, 1964, Ser. No. 341,403
7 Claims. (Cl. 264—79)

This invention is concerned with providing an improved method for finishing surfaces of freshly placed concrete.

The proper finishing of freshly placed concrete involves the taking of precautions against rapid drying and resultant surface cracking following placement of the concrete and during subsequent setting and curing. When the weather is hot, dry, or windy, considerable difficulty is encountered by too rapid evaporation of moisture from the concrete, with resultant surface cracking and the occurrence of other undesirable conditions, such as surface crusting and underlying sponginess with resulting unevenness. Water is removed from the surface faster than it can be replaced by bleeding from the interior of the concrete mass.

Normal precautions taken against this difficulty have to do with the physical conditions under which the concrete is placed and finished. Thus, the selection of a relatively cool time of day for the work, the provision of shade, protection against wind, and the use of fog spray are usual expedients for the prevention of undue evaporation. In instances where it is not possible to obtain these desirable working conditions, resort has been had to covering the surface of the freshly placed concrete with wet burlap or the like until ready for such finishing operations as floating and troweling, and, following the finishing operations, to covering the finished surface of the green concrete with a curing material or compound that inhibits the evaporation of moisture. Various curing compounds are presently on the market for the purpose.

In accordance with the present method, a material capable of producing a so-called "monolayer" or monomolecular film is applied to the surface of the placed concrete immediately after placing and is spread over the surface in some suitable manner, e.g. by initially applying it in dilute aqueous solution, preferably in the form of a spray, or merely by means of the normal finishing operations or preliminary light troweling repeated periodically when it is desired to delay final finishing. This monolayer not only retards evaporation throughout the critical stages, but facilitates the finishing operations.

The monomolecular-film-forming material is preferably mixed intimately with an inert carrier, usually a liquid, although a finely ground mineral material can be used. The carrier acts as an extender in the sense that considerably less of the relatively expensive monomolecular-film-producing material is satisfactory in any given instance than would be the case if used alone. Moreover, the establishment of the monomolecular film over the exposed surface of the concrete is apparently facilitated by its admixture with the extender. An aqueous solution or emulsion of the film-forming material has porven ideal. In the later instance it has been desirable to use an agent, such as benzene, for lowering the temperature at which emulsification is carried out. It is also necessary to use a suitable emulsifying agent, depending upon the particular film-forming material concerned.

The possibility of using monomolecular films to retard evaporation from ponds, reservoirs, and other bodies of water has been recognized for some time, and a number of chemical compounds have been used, at least experimentally, for the purpose. Some of these compounds spread spontaneously on water; others require dissolution in a highly volatile solvent, such as benzene or an ether, to spread effectively. In the latter instances, evaporation of the solvent leaves the required monomolecular film.

Although freshly placed concrete does not resemble a body of water, I have found that a monomolecular film-forming material can be effectively spread over its superficial surface as aforesaid to prevent rapid drying and resultant surface cracking ordinarily accompanying the laying of concrete under hot, dry, or windy climatic conditions.

The invention is described in detail hereinafter with respect to specific procedures and materials presently regarded as the best modes of placing it in commercial practice. From these specific disclosures, further objects and features will become apparent.

Although the essential inventive concept resides in the application, to the moist surface of freshly placed concrete prior to the finishing thereof, of a monomolecular film-forming material and the use of any such material is contemplated, I have found that long chain alcohols and long chain organic acids of from ten carbon atoms on up to the point where high viscosity becomes a problem serve the purpose particularly well, individually or in combination. Below ten carbon atoms, the efficiency is ordinarily too low for practical purposes. Efficiency is greatest with the longer chain compounds, although the practical requirements of application to the concrete and of emulsification make it more desirable in most instances to use shorter chain compounds within the specified range or to mix a shorter with a longer chain compound. Derivatives of the specified alcohols and organic acids, for example, esters, stearates, etc., can also be employed to advantage. Although various petroleum products can also be used to provide a monomolecular film, their use is generally not favored.

Inasmuch as only minute quantities of monomolecular film-forming materials are required to produce films one molecule in thickness over maximum size areas with which this invention is involved, it is preferable that the film-forming material be intimately mixed with some relatively inexpensive carrier prior to their application to the concrete surface. Water serves admirably for the purpose, both as an inert extender for the film-forming material, as a spreading agent, and to provide a layer of moisture upon which the monolayer can form when bleeding water is not adequate.

Although many of the long chain alcohols and organic acids are not soluble in water, emulsions are easily formed as has been previously indicated. These can be diluted with more water at the point of application to provide an economical and highly effective material for use in accordance with the invention, especially before bleeding water has developed on the surface of the freshly placed concrete.

There are various solvents for the long chain alcohols and organic acids that can be safely used as carriers, e.g. lower alcohols, ether, etc., yet these are considerably more expensive and volatile than water and are not ordinarily practical for use in the present method.

Finely ground solid materals, e.g. pumicite, Portland cement, pozzolans, etc., can be used as carriers, but are not nearly as efficient as water and are unimportant for most instances of use of the present method.

A specific example of the preparation of an emulsion for the purpose of the invention is the mixing of equal parts by weight of melted cetyl alcohol (hexadecanol), $CH_3(CH_2)_{15}OH$, and melted dodecanol, $CH_3(CH_2)_{11}OH$; the mixing therewith of an equal weight of benzene for the purpose of lowering the temperature at which emulsification can be carried out; the mixing therewith of an equal weight of a detergent type of emulsifier; and the rapid agitation of the entire mixture in an electric mixer along with ninety-nine times that amount of water. The resulting emulsion is diluted 8 to 1 by water for application to concrete.

Whereas there is here illustrated and specifically described a certain preferred procedure which is presently regarded as the best mode of carrying out the invention, it should be understood that various changes may be made and other constructions adopted without departing from the inventive subject matter particularly pointed out and claimed herebelow.

I claim:

1. A method of finishing concrete which aids substantially in preventing moisture loss during the finishing operation, comprising applying and spreading a material selected from the group consisting of an aqueous solution or emulsion of a film-forming material capable of forming a monomolecular film on the moist surface of freshly placed concrete prior to the finishing thereof and prior to substantial setting thereof, to form a protective film thereover of monomolecular thickness for retarding evaporation of moisture from the concrete and effective while moisture is present to effectuate carrying of the film and carrying out a concrete finishing operation on the so treated surface before substantial setting of the concrete.

2. The method of claim 1, wherein the application of the material is accomplished with a preliminary concrete finishing operation.

3. The method of claim 1, wherein the application and spreading of the material is accomplished by suitably spraying.

4. The method of claim 1, wherein the spreading of the material is accomplished by preliminary troweling of the concrete surface.

5. The method of claim 1, wherein the material comprises a long chain alcohol having at least ten carbon atoms.

6. The method of claim 1, wherein the material comprises a long chain organic acid having at least ten carbon atoms.

7. The method of claim 1, wherein the monomolecular film-forming material is made up of one or more compounds selected from the group consisting of a long chain alcohol having at least ten carbon atoms, a long chain organic acid having at least ten carbon atoms, and derivatives thereof.

References Cited

UNITED STATES PATENTS

| | | | |
|---|---|---|---|
| 1,388,128 | 8/1921 | Smith. | |
| 1,859,253 | 7/1929 | Cross. | |
| 2,023,887 | 12/1935 | Wood. | |
| 2,240,778 | 5/1941 | Hunt. | |
| 2,275,272 | 3/1942 | Scripture | 264—79 |
| 2,575,599 | 11/1951 | Silverman | 106—12 |
| 2,839,811 | 6/1958 | Benedict | 264—79 |
| 2,963,765 | 12/1960 | Tillman. | |
| 3,189,469 | 6/1965 | Littler | 106—12 |
| 3,228,777 | 1/1966 | Kubie | 106—12 |

FOREIGN PATENTS

| | | |
|---|---|---|
| 1,136,625 | 9/1962 | Germany. |
| 380,812 | 9/1932 | Great Britain. |

OTHER REFERENCES

Taylor, W. H., Concrete Technology and Practice, N.Y., 1965, pp. 165–167.

ROBERT F. WHITE, *Primary Examiner.*

R. R. KUCIA, *Assistant Examiner.*